United States Patent [19]

Mehta

[11] 3,891,755

[45] June 24, 1975

[54] DOSAGE FORMULATION FOR ERYTHROMYCIN CETYL SULFATE

[75] Inventor: Shashi Pal Mehta, Waukegan, Ill.

[73] Assignee: Abbott Laboratories, Chicago, Ill.

[22] Filed: May 20, 1974

[21] Appl. No.: 471,391

Related U.S. Application Data

[63] Continuation-in-part of Ser. No. 378,297, July 11, 1973, abandoned.

[52] U.S. Cl............................ 424/157; 424/181
[51] Int. Cl........................ A61j 3/10; A61k 21/00
[58] Field of Search........................... 424/157, 181

[56] References Cited
UNITED STATES PATENTS

| 1,694,341 | 12/1928 | Crossley | 424/157 |
|---|---|---|---|
| 1,831,409 | 11/1931 | Crossley | 424/157 |
| 1,889,366 | 11/1932 | McGowan | 424/157 |
| 2,918,405 | 12/1959 | Barr et al. | 424/181 |
| 3,060,086 | 10/1962 | Kueter | 424/181 |
| 3,137,619 | 6/1964 | Kueter | 424/181 |
| 3,352,752 | 11/1967 | Puetzer | 424/181 |

OTHER PUBLICATIONS

Jalal et al., J. Pharm. Sci. 61(9): 1466–1468 (1972), "Tablet Granulations Composed of Spherical-Shaped Particles."

Hurwitz, J. Pharmacol Exp. Ther. 179(3): 485–489 (1971), "Effects of Antacids on Gastrointestinal Drug Absorption."

El–Nakeeb et al., Acta. Pharm. Svecica 5(1): 1–8 (1968) "Influence of Various Materials on Antibotics in Liquid Pharmaceutical Preparations."

Primary Examiner—Shep K. Rose
Attorney, Agent, or Firm—Paul D. Burgauer; Robert L. Niblack

[57] ABSTRACT

A new tableting formulation is described for erythromycin antibiotic formulations which produce, upon ingestion, surprisingly high blood levels regardless of whether the tablet is administered to fasting or non-fasting subjects. The new formulation contains magnesium hydroxide as a major tablet component together with the usual generally accepted excipients used in elegant tablet formulations.

10 Claims, No Drawings

DOSAGE FORMULATION FOR ERYTHROMYCIN CETYL SULFATE

BACKGROUUND OF THE INVENTION

This application is a continuation-in-part of the application filed on July 11, 1973, under Ser. No. 378,297, now abandoned.

DETAILED DESCRIPTION OF THE INVENTION

The general goal of any antibiotic therapy is the maintenance of a sufficiently high blood level of its active component to combat an infection with the smallest possible doses of the antibiotic and the least number of administrations thereof. Erythromycin salts such as the aliphatic sulfates described in U.S. Pat. No. 3,558,594 of 1971, and the carboxylic acid salts of erythromycin described in U.S. Pat. Nos. 2,862,921 and 2,993,833 have significant and desirable antibiotic activities but up to now it has been rather difficult to maintain a high blood level with this series except through frequently repeated doses and/or high dosage amounts.

It is therefore an object of this invention to prepare a pharmaceutical dosage form for orally active erythromycin salts that produce a high blood level. It is a particular object of this invention to prepare an oral dosage form for an aliphatic carboxylic or sulfate salt of erythromycin. It is a further and specific object of this inventnion to provide an oral dosage form for an erythromycin aliphatic sulfate or carboxylic acid salt that produces a high blood level of antibiotic activity.

These and other objects are accomplished by combining 4 parts of an orally active, organic sulfate or carboxylic acid salt of erythromycin with 0.5 – 6 parts of magnesium hydroxide, 0.25 – 6 parts of a binder, granulating this mixture and compressing it in the presence or absence of other excipients ordinarily used in the preparation of pharmaceutical dosage forms into tablets designed for oral ingestion.

It has been found that the activity of the above salts of erythromycin is greatly increased by combining them with a significant amount of magnesium hydroxide. Although many magnesium salts have been known and have been used in compounding the above antibiotics, it was totally unexpected that by using this particular compound, a drastically improved result in blood level is obtained over the blood level obtained by using other magnesium derivatives.

In a simple embodiment of the present invention, 4 parts of the above type of an erythromycin salt are uniformly blended with 0.5 – 6 parts of magnesium hydroxide and this mixture is then dry-blended with 0.25 – 6 parts of a binder. This mixture is granulated in the usual fashion by making a uniform mass therefrom by the addition of water, drying the mass and passing the mixture through a screen of 10 – 20 mesh size (U.S. scale). Other desirable excipients such as lubricants, disintegrating agents, flavoring agents, coloring agents or the like can be uniformly blended with the granules so obtained and the mixture is then compressed into tablets of suitable size for oral administration.

A preferred tablet made in the above fashion contains between 250 and 450 mg. of an orally active erythromycin salt of the above type. Although some of these salts are recognized to give a longer erythromycin blood level than others, the use of a substantial amount of magnesium hydroxide increases the blood level significantly in all instances over tablets made in the same manner except for the use of a different buffer, particularly under nonfasting conditions. A clear demonstration of this effect is shown in the following examples which, however, are not intended to limit the invention in any respect. In these examples as well as in other parts of this description, all "parts" used are intended to mean parts by weight.

EXAMPLE 1

| | Ingredients | Parts |
|---|---|---|
| A) | Magnesium hydroxide NF | 250 |
| B) | Erythromycin cetyl sulfate | 365.5 |
| C) | Corn starch U.S.P. | 160 |
| D) | Magnesium stearate U.S.P. | 2 |
| E) | Water | q.s. |
| F) | Coating solution (approximately) | 120 |

Items A and B were blended together with 90 percent of Item C. The remainder of C was mixed with water to form a paste. This paste and the dry blend of A, B and C were blended and the resulting mixture was passed through a 6-mesh screen (U.S. scale) and dried overnight at 49° C. The dried granulation mass was passed through a 16-mesh screen and subsequently blended with D. The mixture was then compressed into tablets containing 250 mg. of erythromycin activity per tablet.

These tablets were coated by the method described by Endicott, et al., in U.S. Pat. No. 2,881,085 to produce salmon colored, elegant tablets that are easy to swallow. The coating operation was performed in the usual fashion in a coating pan and the tablets were subsequently dried.

EXAMPLE 2

The identical procedure to that of Example 1 was used to produce tablets of identical erythromycin potency, although the actual amount of erythromycin cetyl sulfate was higher due to the lower drug activity. The following ingredients and amounts were used:

| | Ingredient | Parts |
|---|---|---|
| A) | Magnesium hydroxide | 250 |
| B) | Erythromycin cetyl sulfate | 406 |
| C) | Starch (dry) | 80 |
| | Starch (paste) | 80 |
| D) | Magnesium stearate | 2 |
| E) | Water | q.s. |

The tablets compressed from this mixture were also designed to contain 250 mg. of antibiotic activity per tablet.

EXAMPLES 3 – 6

In repeating the procedure of Example 1, but using buffers other than magnesium hydroxide, other tablets containing 250 mg./tablet of erythromycin activity were prepared. The following substitutions for magnesium hydroxide were made:

Example 3: 200 parts of sodium citrate
Example 4: 250 parts of magnesium oxide

-Continued
*Example 5:    400 parts of aluminum hydroxide
*Example 6:    400 parts of calcium carbonate

*The amount of starch was increased to 200 parts and all of it was used in the form of an aqueous paste.

EXAMPLE 7

The tablets made in accordance with the above examples were administered orally to adult human volunteers and their blood samples were tested after 1, 2, 3, 4, 5 and 6 hours after the ingestion of the dosage form for the purpose of establishing a blood level response curve. All values of each group of volunteers were averaged, producing the following maximum drug activity peaks (MDAP) and total areas below the curve (ABC). The MDAP values are expressed in $\mu$g./ml., the ABC-values in $\mu$g. X hr./ml. in Table I below.

TABLE I

| Example | MDAP | ABC | Subjects |
|---------|------|------|----------|
| 1 | 0.70 | 1.70 | 39 |
| 2 | 0.90–0.99 | 2.02–2.46 | 72 |
| 3 | 0.56 | 1.50 | 10 |
| 4 | 0.52 | 1.60 | 10 |
| 5 | 0.05 | 0.16 | 10 |
| 6 | 0.52 | 1.2 | 10 |

From the above table it will be quite apparent that the use of magnesium hydroxide, in the current tableting formulation produces unexpected and very significantly advantageous results over tablets using other buffers. Interpreting the above figures, the composition of the tablets made according to this invention (Examples 1 and 2) show a 25 – 70 percent improvement in drug activity peak over the tablets made in accordance to the standard formulations represented in Examples 3, 4 and 6: the area below the activity curve values shows an improvement of 30 – 75 percent in the same comparison.

EXAMPLE 8

| | | |
|---|---|---|
| A) | Erythromycin stearate (640 mcg./mg.) | 390 g. |
| B) | Microcrystalline cellulose (N.F.) | 35 g. |
| C) | Polyvinylpyrrolidone | 35 g. |
| D) | Magnesium hydroxide | 260 g. |
| E) | Disintegrant | 35 g. |
| F) | Coating solution | 246 ml. |
| G) | Ethanol | 75 ml. | a. After dissolving about half of C in G and separately combining Items A, B and the remaining part of C, the two mixes were combined and granulated in the usual fashion. The granules were passed through a 6-mesh screen (U.S. scale), dried overnight at 49° C., sifted, passed through a 16-mesh screen, combined with the remaining ingredients and compressed into tablets. The tablets were coated like in the previous examples.

b. Tablets identical to the above, but using 260 g. of sodium citrate in place of the above Item D were made in the described fashion.

The disintegrant used above can be selected from a large variety of known tableting excipients. Most commonly, corn starch is used for this purpose; others include Amberlite, Veegum, sodium carboxymethylcellulose, alginic acid and the like.

c. Blood levels were studied on fasting and nonfasting human volunteeers (16 subjects each for a and b) and were carried out in the same fashion as described in Example 7, except that readings were also taken after 12 hours. The results are reproduced in Table II, using the abbreviations of Example 7.

TABLE II

| | Tablet a | Tablet b |
|---|----------|----------|
| Fasting levels MDAP | 0.752 | 0.732 |
| Fasting ABC 1–6 hrs. | 2.39 | 1.92 |
| Fasting ABC 1–12 hrs. | 3.00 | 2.35 |
| Nonfasting levels MDAP | 0.641 | 0.129 |
| Nonfasting ABC 1–6 hrs. | 1.46 | 0.37 |
| Nonfasting ABC 1–12 hrs. | 1.78 | 0.54 |

The above results clearly show the vastly improved levels attained with the tablets containing the magnesium hydroxide (Tablet a) over standard tablets widely used in the past. While the fasting peak drug level in blood is not significantly different, the time of occurrence of the peak is much earlier for the older tablet (b) than with the tablet of the current invention. This is clearly shown by the area under the curve (ABC) for 6 and 12 hours. Also, a very significantly advantage is seen on the peak blood level attained on the nonfasting subjects; as this is the stage most patients will take antibiotic medication, the drastically elevated peak blood level of tablet (a) over tablet (b) provides a significant advantage.

While the above blood level studies are shown only with the erythromycin cetyl sulfate salt and erythromycin stearate, other aliphatic sulfate or carboxylic acid salts of erythromycin behave in similar fashion and produce higher serum content of erythromycin activity when compounded with the magnesium hydroxide of this invention than by using previously utilized salts or buffers, e.g., magnesium oxide, sodium citrate and the like. Since magnesium hydroxide is virtually an inert material as far as the digestive tract of mammals is concerned, the present combination is of great interest. It enables the prescribing physician to administer smaller doses of the desired erythromycin salt to obtain the desired blood level of antibiotic activity or, conversely, to attain a higher activity level than with equal doses of the identical drug compounded by using the other buffers. In either way, the new combination reduces the cost of therapy based on drug administration of a given activity.

The tablets of the present invention may be covered with a water soluble or water dispersible colored coating as shown above. However, this is an optional procedure. Soluble coatings do not interfere with the absorption of the drug through the gastrointestinal tract.

The above demonstration of blood levels obtained using different buffers were done on "nonfasting" subjects; such blood levels are generally poor for any kind of an erythromycin formulation. It was therefore even more surprising to find that by using magnesium hydroxide in the formulation for tablets of aliphatic salts of erythromycin, highly satisfactory levels were obtained with surprisingly low doses of the active erythromycin salt. Since the "nonfasting" blood levels obtained with the tablets of this invention are considerably higher than the "fasting" levels, the tablets of the present invention are more universally useful than other oral preparations of erythromycin.

While the above specification exemplifies the term "binder" primarily as starch or polyvinylpyrrolidone, other binders can be used in their place. These are well known in the trade and are often used interchangeably, i.e., natural gums such as acacia or tragacanth, or modified natural products such as gelatin, methylcellulose or sodium carboxymethylcellulose.

I claim:

1. The process of preparing pharmaceutical tablets producing high blood levels of erythromycin, comprising uniformly blending 4 parts of an aliphatic carboxylic or sulfate salt of erythromycin with 0.5 – 6 parts of magnesium hydroxide, uniformly blending said mixture with 0.25 – 6 parts of a binder, granulating this mixture in known fashion, drying the granules, uniformly blending the granules with minor optional portions of a lubricant and other commonly used excipients and compressing this mixture into tablets.

2. The process of claim 1 wherein said erythromycin salt is erythromycin cetyl sulfate.

3. The process of claim 1 wherein said erythromycin salt is erythromycin stearate.

4. A pharmaceutical tablet which, upon ingestion, produces a high blood level of erythromycin, comprising as the active ingredient a salt between erythromycin and an aliphatic sulfate or an aliphatic carboxylic acid and between 0.25 and 1.5 parts of magnesium hydroxide per part of said salt, and the commonly used tableting excipients.

5. A tablet according to claim 4 wherein said tableting excipients primarily consist of starch.

6. A tablet according to claim 5 wherein said starch is present in an amount of between 0.5 and 1.5 parts per part of said salt of erythromycin.

7. A tablet according to claim 6 wherein said salt of erythromycin is erythromycin cetyl sulfate.

8. A tablet according to claim 7 wherein the magnesium hydroxide is present in an amount of between 0.25 and 1.5 parts and the starch is present in an amount of from 0.5 to 1.5 parts per part of erythromycin cetyl sulfate.

9. A tablet according to claim 6 wherein said salt of erythromycin is erythromycin stearate.

10. A tablet according to claim 9 wherein the magnesium hydroxide is present in an amount of between 0.25 and 1.5 parts and the starch is present in an amount of from 0.5 to 1.5 parts per part of erythromycin stearate.

* * * * *